Oct. 14, 1924.
L. O. MARKHAM
VEHICLE BRAKE
Filed April 3, 1924
1,511,976
2 Sheets-Sheet 1
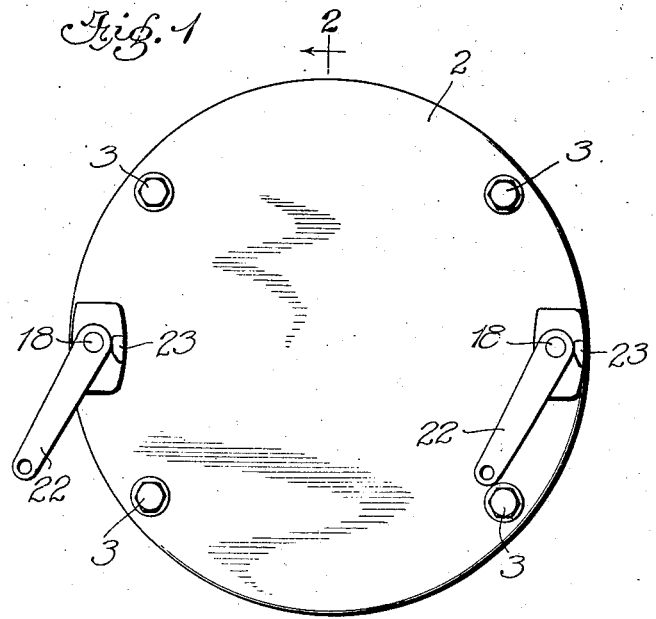
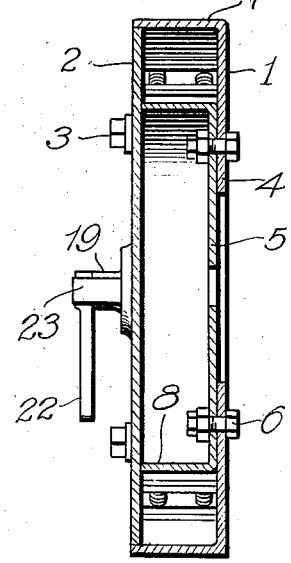
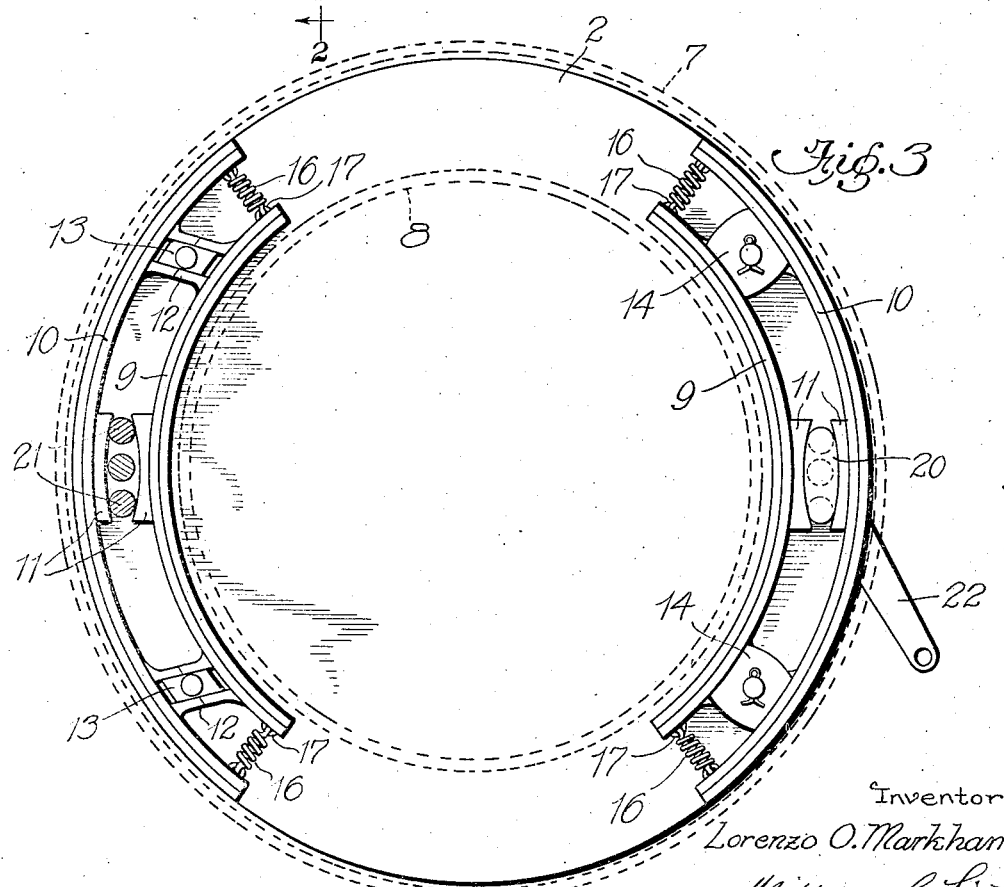
Inventor
Lorenzo O. Markham
By William C. Linton
Attorney Oct. 14, 1924.
L. O. MARKHAM
1,511,976
VEHICLE BRAKE
Filed April 3, 1924
2 Sheets-Sheet 2
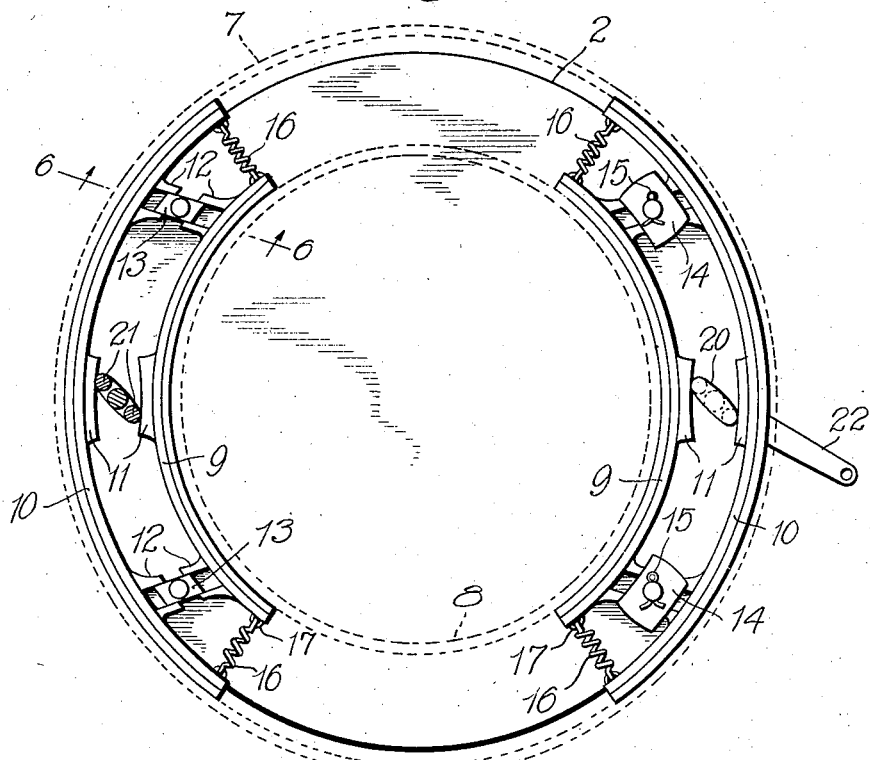
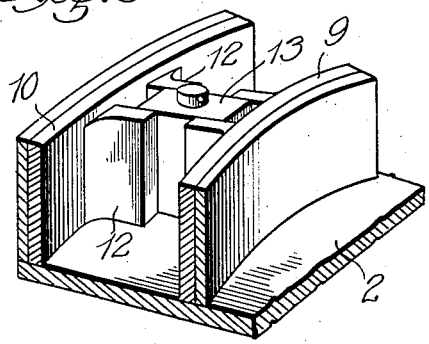
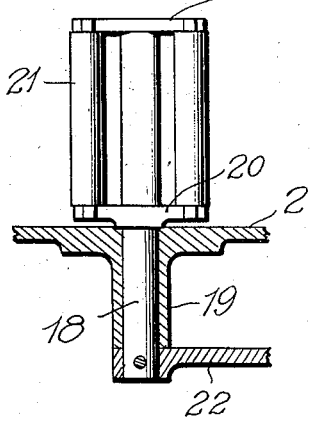
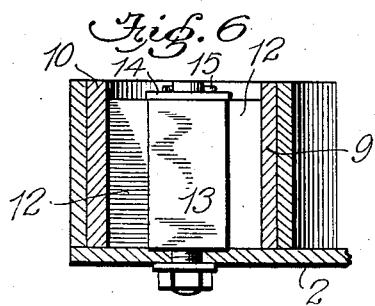
Inventor
Lorenzo O. Markham
By William C. Linton,
Attorney Patented Oct. 14, 1924.

1,511,976

UNITED STATES PATENT OFFICE.

LORENZO O. MARKHAM, OF OLYMPIA, WASHINGTON.

VEHICLE BRAKE.

Application filed April 3, 1924. Serial No. 704,040.

*To all whom it may concern:*

Be it known that I, LORENZO O. MARKHAM, a citizen of the United States of America, residing at Olympia, in the county of Thurston and State of Washington, have invented certain new and useful Improvements in Vehicle Brakes; and I do hereby declare that the following is a full, clear, concise, and exact description of the invention, such as will enable others skilled in the art to which it appertains to make and use the same.

This invention relates to improvements in vehicle brakes, having for an object to provide a braking means of the internal type including a novel arrangement of brake shoes, adapted to direct compound braking pressures onto the brake drums employed in connection therewith, whereby to fully effect braked or checked rotation of an equipped wheel in a minimum amount of time and distance.

It is also an object of the invention to provide the device with expanders so constructed as to bring about the positive and immediate braking thrusts to the brake shoes, and which will prevent the brake lining from becoming completely worn out with the resultant wearing of the shoes and drums.

Another and equally important object of the invention is to provide the device with means for retaining the opposed brake shoes in their proper relative positions, either during usage or non-usage thereof, thus ensuring operation of the same at maximum efficiency.

Other objects of the invention will be in part obvious, and in part pointed out hereinafter.

In order that the invention and its mode of operation may be readily understood by persons skilled in the art, I have in the accompanying illustrative drawings, and in the detailed following description based thereupon, set out one possible embodiment of the same.

In these drawings:—

Figure 1 is a side elevation of the improved braking device;

Figure 2 is a vertical section taken on the line 2—2 of Figure 1 looking in the direction in which the arrows point;

Figure 3 is an enlarged detail in side elevation showing the relative positioning of the brake shoes with respect to the brake bands or brake shoe engaging portions of the brake drum; the shoes being in non-braking position;

Figure 4 is a similar view wherein the braking shoes are shown in their braking positions;

Figure 5 is a fragmentary detail in perspective showing one of the braking shoe guides;

Figure 6 is an enlarged fragmentary detail in section, taken on the line 6—6 of Figure 4 looking in the direction in which the arrows point; and, Figure 7 is a detail in elevation of one of the brake shoe expanders.

Having more particular reference to the drawings, in connection with which like characters of reference will designate corresponding parts throughout, the improved brake may be stated to comprise a drum generally indicated by the numeral 1, one side of which is open and with assembly of the brake is adapted to be closed by means of a circular cover plate 2 fitted into the open side as clearly shown in the Figure 2 and secured in such fitted position and against displacement through the medium of bolts generally indicated by the numeral 3, such bolts serving for other functions which will be hereinafter more fully described. In this connection, it will be noted that the brake drum 1 is formed by the nesting of a pair of circular drums clearly shown in the Figure 2 and indicated by the numerals 4 and 5 respectively, these drums being concentrically arranged with respect to each other and interconnected against relative movement in any way whatsoever through the medium of bolts or similar fastening devices passed through adjacent portions of the bodies thereof. Each of the drums 4 and 5 are provided with peripheral brake shoe engaging portions or bands indicated for the purpose of convenience by the numerals 7 and 8.

Opposed arcuate brake shoes 9 and 10 are arranged between the brake shoe engaging or band portions 7 and 8 of the drums 4 and 5 and as is usual in the art, have their braking surfaces lined or covered with suitable brake lining or friction material (not shown herein). Bearing ribs 11 are fixedly arranged upon the inner and adjacent surfaces of the several shoes 9 and 10 in opposed relationship, as shown in the Figures 3 and 4, the inner sides of these bearing devices being concaved and adapted to receive the brake expanders hereinafter more fully described, therebetween.

In order that the several pairs of opposed brake shoes 9 and 10 may be properly retained in their relative positions, at all times, and either during periods of usage or non-usage, spaced guide ribs or brackets arranged in pairs and indicated by the numeral 12 are secured to the inner sides of the opposite end portions of such shoes 9 and 10 in the manner shown in the Figures 3 and 4 and slidably engage with shoe guides comprising block-like devices 13 carried upon the shank portions of the bolts 3 extending through portions of the cover plate 2 hereinbefore described. These opposed pairs of guide brackets 12, as will be noted, are diagonally arranged and in consequence, will permit of relative radial movement as between the several brake shoes 9 and 10 inter-connected through the shoe guides 13. If desired, end plates 14 are arranged upon the extremities of the bolts 3 beyond the free extremities of the shoe guides 13 thereon, whereupon cotter pins 15 or similar fastening devices are passed through adjacent portions of the shanks of such bolts 3 for an obvious purpose.

With a view towards providing means for normally retaining the brake shoes 9 and 10 in retracted position whereby to avoid undue wearing or dragging upon the brakes and to keep the brake shoes clear of the engaging portions of the drums 4 and 5, contractile coiled springs 16 are connected through eyelets 17 or similar means to the opposite end portions of the brake shoes 9 and 10. Thus, inward pulls will be normally imparted to such brake shoes 9 and 10, hence, normally retaining the same in their contracted positions.

To impart outward or opposed braking thrusts to the brake shoes 9 and 10, stub shafts 18 are rotatably mounted in bearing sleeves 19 formed integral with the cover plate 2 and fixedly carry upon their inner extremities bracket arms or bearing arms 20 between which rollers 21 are rotatably mounted. These expanders constituted by the bracket arms 20 and the rollers 21 are adapted to be arranged between the concaved surfaces of the bearing ribs 11, as shown in the Figures 3 and 4. Thus, means are had whereby the braking shoes 9 and 10 may be forced into braking engagement with the brake shoe engaging portions or bands 7 and 8 hereinbefore referred to.

Rocker arms 22 are fixedly connected to the outer ends of the stub shafts 18 and are adapted to have their free ends connected to suitable forms of operating rods or mechanisms, not shown herein, whereby they may be rocked collectively or in unison for imparting oscillatory movement to the expanders constituted by the bracket arms 20 and the rollers 21. With such oscillatory movement of the expanders, it will be understood that they will move from their normal or inactive positions, as shown in the Figure 3, to those positions shown in the Figure 4, thus causing opposite or opposed braking thrusts to be imparted to the brake shoes 9 and 10 and thereby effecting the desired braking operation as between the same and the portions 7 and 8.

To avoid excessive rotation of the brake shoe expanders, that is, rotation of the same to positions whereat they will be on "dead center" and in consequence, will not return to their normal or inoperative positions, I regulate their rocking or oscillatory movement by arranging stop lugs 23 upon portions of the cover plate 2 directly adjacent the bearing sleeves 19. In this way, rocking movement or oscillation of the expanders through the rocker arm 22 will be prevented from becoming excessive to such an extent as to permit the expanders to assume positions directly crosswise between their respective pairs of brake shoes 9 and 10. By so avoiding the "dead centering" of the expanders with relation to their respective brake shoes 9 and 10, it will be understood that the same with release of the rocker arm 22 will immediately return to their normal or inoperative positions, as shown in dotted and full lines in the Figure 3, hence, permitting the contractile coiled springs 16 to function in their return of the brake shoes 9 and 10 to retracted or inoperative positions.

It will be also understood that because of the limiting or regulating of the oscillatory or rocking movement of the rocker arm 22 together with movement of the brake shoe expanders, the brake lining employed in connection with the brake will be prevented from becoming entirely worn out, in that since the extent of braking engagement of the braking shoes 9 and 10 with the protions 7 and 8 of the drums 4 and 5 will be limited, the operator of a vehicle equipped with the improved brake will be apprised when the brake lining has become worn to such an extent as to require replacement by the fact that the proper braking power will not be had with usage of the improved brake.

It will be also understood that the improved form of brake is such as to require no adjustments as between the various pairs of brake shoes 9 and 10 such as may be employed in a single device, the only adjustment necessary to secure proper braking power or equalization of such braking power being in the connecting rods or operating mechanism for the rocker arms 22, such mechanism being either connected to the foot or service brake or hand or emergency brake of an equipped vehicle.

Also, it is to be understood that while I have herein shown two sets or pairs of opposed brake shoes, the number of these sets or pairs may be varied, such as conditions or preference may dictate.

Manifestly, the construction shown is capable of considerable modification, and such modification as is within the scope of my claims, I consider within the spirit of my invention.

I claim:

1. A vehicle brake comprising in combination with a brake drum having relatively spaced parallel brake shoe engaging portions, spaced and relatively opposed brake shoes between the engaging portions of such drum, opposed bearing means on the shoes, and expander means positioned between such bearing means.

2. A vehicle brake comprising in combination with a brake drum having relatively spaced parallel brake shoe engaging portions, spaced and relatively opposed brake shoes between the engaging portions of such drum, opposed bearing means on the shoes, pairs of complementally arranged guide brackets arranged upon and disposed between the opposite portions of said brake shoes, guides immovably received between the complementally arranged pairs of guide brackets, and expander means positioned between such bearing means.

3. A vehicle brake comprising in combination with a brake drum having relatively spaced parallel brake shoe engaging portions, pairs of spaced and relatively opposed brake shoes between the engaging portions of such drum, bearing ribs upon the intermediate portions of the inner sides of said shoes, guide means connected to and arranged between the opposite end portions of said brake shoes, means for slidably inter-connecting said guide means, and expander means positioned between said bearing means and adapted to be collectively operated.

4. A vehicle brake comprising in combination with a brake drum having relatively spaced parallel brake shoe engaging portions, pairs of spaced and relatively opposed brake shoes arranged between the engaging portions of said drum, bearing ribs arranged upon the intermediate portions of the inner sides of said shoes, guide brackets complementally arranged upon the inner side and adjacent the opposite end portions of such brake shoes, guides immovably received between said guide brackets, means for yieldably retaining said brake shoes in their inoperative positions with respect to the brake drum, and expander means positioned between said bearing ribs.

5. A vehicle brake comprising in combination with a brake drum having relatively spaced parallel brake shoe engaging portions, pairs of spaced and relatively opposed brake shoes arranged between the engaging portions of said drum, spring means connected between said brake shoes for normally retaining the same in their contracted positions, means for slidably inter-connecting said brake shoes, bearing ribs arranged upon the inner sides and intermediate portions of said brake shoes, and collectively operable expander means positioned between such bearing means.

6. A vehicle brake comprising a brake drum proper consisting of nested and concentrically arranged drums having peripherally formed brake shoe engaging portions, pairs of spaced relatively opposed brake shoes positioned between said brake shoe engaging portions of said drums, means for slidably inter-connecting said brake shoes, spring means connected between the brake shoes for normally retaining the same in their contracted positions, bearing means arranged upon the inner sides and adjacent the intermediate portions of said brake shoes, and oscillatable collectively operable expander means arranged between said bearing means.

In witness whereof I have hereunto set my hand.

LORENZO O. MARKHAM.